July 28, 1925.
I. H. SPENCER
1,547,269
PRESSURE AND VOLUME REGULATOR FOR FLUIDS
Filed June 15, 1921
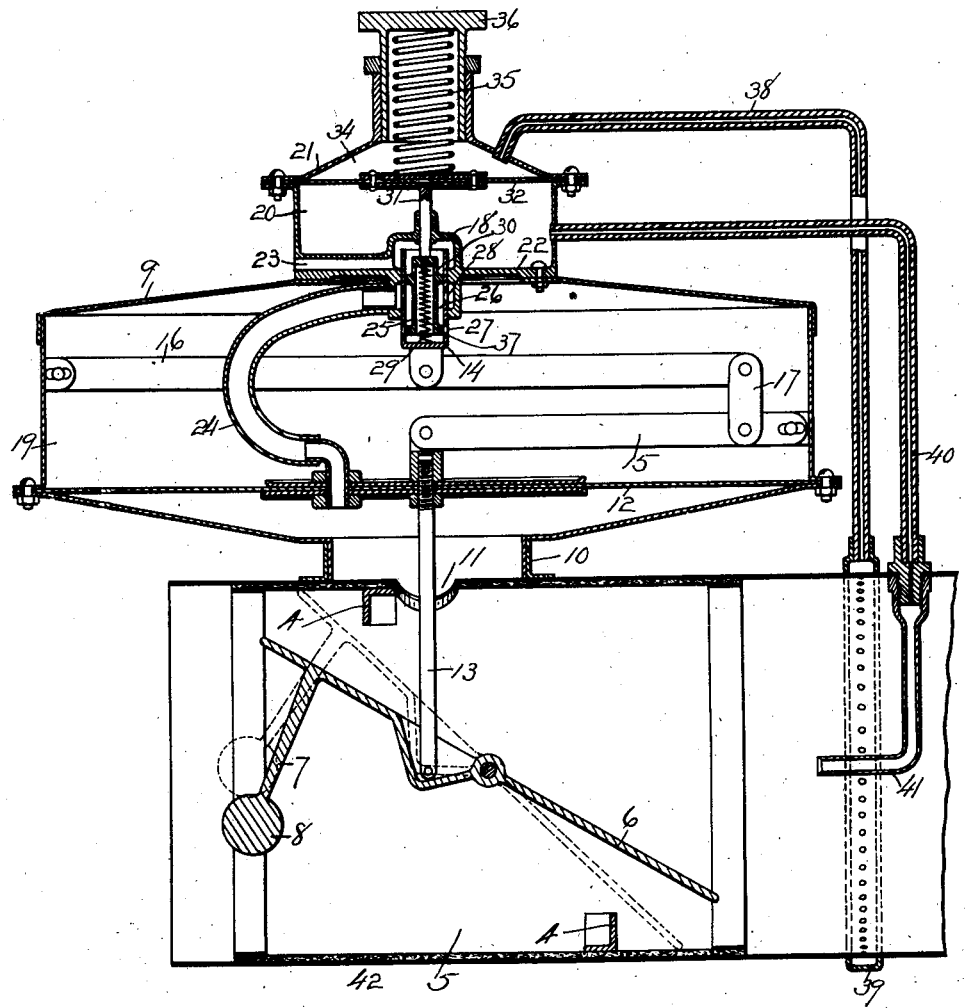
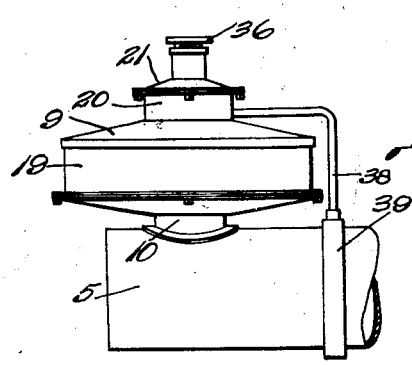
INVENTOR
Ira H. Spencer,
BY
Arthur Jenkins
ATTORNEY Patented July 28, 1925.

1,547,269

UNITED STATES PATENT OFFICE.

IRA H. SPENCER, OF HARTFORD, CONNECTICUT, ASSIGNOR TO THE SPENCER TURBINE COMPANY, OF WEST HARTFORD, CONNECTICUT, A CORPORATION OF CONNECTICUT.

PRESSURE AND VOLUME REGULATOR FOR FLUIDS.

Application filed June 15, 1921. Serial No. 477,851.

*To all whom it may concern:*

Be it known that I, IRA H. SPENCER, a citizen of the United States, and a resident of West Hartford, in the county of Hartford and State of Connecticut, have invented new and Improved Pressure and Volume Regulators for Fluids, of which the following is a specification.

My invention relates to the class of devices that are employed to regulate the pressure or the volume of fluid flowing, as through a conduit, and an object of my invention, among others, is to provide a device of this class that may be readily arranged to regulate the pressure or volume of such fluid in a particularly efficient manner.

One form of device embodying my invention and in the construction and use of which the objects herein set out, as well as others, may be attained, is illustrated in the accompanying drawings, in which—

Figure 1 is a view in central vertical section through a conduit and through my improved regulator shown as connected thereto, it being understood that the conduit is round in cross section and that the case of the regulator is also round in cross section which in the regulator as illustrated would be in a horizontal plane, one of the tubes leading from the conduit to the regulator being shown as somewhat distorted in order to clearly illustrate the structure.

Figure 2 is a view illustrating a modified form of the apparatus.

In the accompanying drawings the numeral 5 indicates a conduit for conducting flow of fluid, as air, for any purpose that may be desired. The conditions of use of the air flowing through said conduit are such, in numerous instances, as to require that the volume of air passing through said conduit within a given period shall be under control, and the device illustrated and described herein and embodying my invention provides means for maintaining such control.

A damper or valve 6 is pivotally mounted in the conduit, the latter having interrupters 4 at the top and bottom sides to reduce the velocity of the air when the dampers are nearly closed, such effects being of advantage when the conduit is used for the supply of air as to a musical instrument. The damper is provided with an arm 7 terminating in a weight 8, that may be integrally formed on the arm, which weight is used to hold the valve normally open. A regulator case 9 is supported upon the conduit as by means of a neck 10, the passage through which communicates with an opening 11 through the wall of the conduit, and a damper actuating diaphragm 12 extends across the case 9, preferably near its lower end. A damper actuating rod 13 operatively connects the damper and diaphragm, being connected to said parts in any suitable manner. The diaphragm and said actuating rod are operatively connected, by a system of links and levers, with a valve-cylinder 14, such system in the structure herein comprising two levers 15—16 pivotally attached at their opposite ends to opposite sides of the case 9, and a link 17 connecting the free end of the lever 16 with the lever 15 near its pivot, this arrangement being for the purpose of increasing the degree of movement of the damper 6 as compared with that of the valve-cylinder 14 in the structure herein shown the degree of the movement of the damper being about sixteen times greater than that of said cylinder.

This valve-cylinder is mounted for reciprocating movement in a housing 18 located, in the structure herein shown, partly in a chamber 19 in the case 9 and partly in a chamber 20 in a dome located on top of the case 9, said housing, as herein illustrated, comprising an integral part of the bottom of said dome that forms a cover 22 which closes an opening in the top of the case 9. A relief passage 23 extends from the chamber within the housing out through the wall of the dome 21, and a pressure equalizing tube 24 extends from the chamber within the housing to the diaphragm 12 to provide a passage from said chamber through said diaphragm.

A piston-valve 25 is located for reciprocating movements within the valve-cylinder 14 and has a groove around its periphery forming a passage 26 arranged to register with ports 27 through the wall of the valve-cylinder and communicating with the chamber 19, said passage being also adapted to register with ports 28 through the wall of said valve-cylinder and communicating with the passage through the tube 24. The piston-valve has a central opening 29 extending from its lower end and ports 30 connecting said central opening with the open upper end of the valve-cylinder 14.

A piston-valve-operating-rod 31 extends through the top of the housing and connects the piston-valve with a piston-valve-operating-diaphragm 32 extending across the chamber in the dome 21 and dividing said chamber into two chambers, a dynamic-pressure-chamber 20 and a static-pressure-chamber 34. A main spring 35 is seated against the diaphragm 32 and thrusts with its upper end against a spring adjusting cap 36 closing an opening in the upper end of the dome and secured in place as by means of interengaging screw threads. A valve-piston-operating-spring 37 is located within the opening in the central part of the valve-piston and is seated upon the bottom of the chamber in the valve-cylinder 14. A static-pressure tube 38, that may be composed of rubber or other suitable material, extends from the static-pressure chamber 34, and a static-pressure ring 39, surrounding the conduit 5, has an annular chamber communicating with the interior of the conduit, as by means of small ports, as shown in the drawing. The dynamic-pressure chamber 20 is in communication with the conduit 5 as by means of a dynamic-pressure tube 40 that terminates in a nozzle 41 opening into the conduit lengthwise thereof and preferably at its axial center.

This arrangement causes the static pressure within the conduit 5 to be transmitted to the chambers 20 and 34, such pressure being, therefore, equalized in said chambers when air is not flowing through the conduit 5. In the operation of the device the parts being in the position shown in the drawings it will be observed that the damper 6 is held open by means of the weight 8, it being assumed that air within the conduit is not in motion. Such air being set in motion, as by a fan or blower, will pass, as to a portion, into the nozzle 41 and therefrom to the chamber 20 within which the pressure will be increased by such dynamic action thereby creating what I term a dynamic pressure, this being a pressure exceeding that of the normal static pressure within the chambers 20 and 34. The tension of the spring 35 being adjusted by means of the cap 36 to provide for the flow of a certain volume of air through the conduit 5, when the rate of movement of such air exceeds a point to provide the necessary volume the dynamic pressure within the chamber 20 will raise the diaphragm 32 and this will raise the piston-valve 25 and open the ports 27 allowing air to flow from the chamber 19 into the lower end of the valve-cylinder and upwardly through the central opening in the piston-valve, through the ports in the upper end thereof and outwardly through the relief passage 23. The pressures on opposite sides of the diaphragm 12 will thus be unbalanced and the latter will move upwardly, imparting a closing movement to the damper 6. This upward movement of the diaphragm 12, through the levers 15 and 16, will impart an upward movement to the valve-cylinder 14, and this being independent of movement of the piston-valve the ports 27 will be closed, and the movement of the damper will cease. This closing of the damper will reduce the velocity of the current of air through the conduit 5 and hence reduce the dynamic pressure in the chamber 20 and consequently the diaphragm 32 will move downwardly whereby the ports 27 will be opened into the passage 26 around the piston-valve so that the pressure underneath the diaphragm 12, which is now in excess of that above said diaphragm, will be transmitted through the equalizing tube 24, the passage 26 and the ports 27 to the upper side of the diaphragm, thus equalizing the pressure on both sides of said diaphragm and causing the latter to move downwardly, thus imparting an opening movement to the damper 6. In this downward movement of the diaphragm 12 the levers 15 and 16 will operate to move the valve-cylinder 14 downwardly thereby closing the ports 27, and the operations thus described will be repeated so long as the velocity of the air in the conduit 5 exceeds or falls short of the rate to supply that quantity of air for which the regulator is "set". In this operation of the parts the spring within the opening 29 will assist in the movements of the valve-cylinder 14 as well as that of the piston-valve 25.

The device may be readily adapted to control the pressure of air and to maintain a required degree of such static pressure by connecting the tube 38 with the chamber 20 and dispensing with the tube 40 and nozzle 41. When thus arranged the static pressure will be communicated to the chamber 20 and the operations of the diaphragm 32 will be effected by the pressure in the chamber 20 acting in opposition to the force of the spring 35 to operate the piston valve and the valve-cylinder. The valve 6 is of such shape that it will contact with its seat at all points about its periphery when it is closed, such seat in the structure herein shown being constituted by a lining 42 as of felt or other yielding material.

As hereinbefore mentioned this device is especially applicable for controlling the supply of air to a musical instrument, and in such use it is material that when the instrument, as an organ, is not playing, or is playing very softly with very little air flowing thru the conduit, and there being nothing, therefore, to drown the noise which may be transmitted on this volume of air, that at such time, some means shall be provided to prevent the transmission of sound on such volume of air, and to this end the interrupters 4 are located at the top and bottom sides of the conduit to provide a tortuous passage between the periphery of the valve which is seated close to the interrupters and said interrupters, this passage breaking up the sound waves and, therefore, reducing the transmission of sound upon the volume of air.

The rod 31 is constructed to rest with one end against the diaphragm 32 so that no cramping action is effected by the parts to restrict free and easy movement of said rod.

In accordance with the provisions of the patent statutes I have described the principles of operation of my invention, together with the device which I now consider to represent the best embodiment thereof; but I desire to have it understood that the device shown is only illustrative, and that the invention may be carried out by other means.

I claim—

1. A regulator for controlling flow of air through a conduit and comprising a case, a diaphragm dividing said case into chambers, a tube connecting one of said chambers with said conduit whereby pressure is transmitted from the latter to the former, a damper actuating diaphragm for operating a damper in said conduit, and a connection between said damper actuating diaphragm and the other diaphragm and including a valve operated by the last mentioned diaphragm to affect pressures on opposite sides of the damper actuating diaphragm.

2. A regulator for controlling flow of air through a conduit and comprising a case, a diaphragm dividing said case into chambers, a tube connecting one of said chambers with said conduit whereby pressure is transmitted from the latter to the former, a damper actuating diaphragm, a valve cylinder operatively connected with said damper actuating diaphragm, a valve piston located in said cylinder to control pressures on opposite sides of said valve operating diaphragm, and a connection between said piston and the first mentioned diaphragm.

3. A regulator for controlling flow of air through a conduit and comprising a case, a diaphragm dividing said case into chambers, a tube connecting one of said chambers with said conduit whereby pressure is transmitted from the latter to the former, a damper actuating diaphragm, a valve cylinder, a system of levers connecting said diaphragm and cylinder to impart the movement of the diaphragm to the cylinder to a reduced extent, a valve piston located in said cylinder to control pressures on said valve operating diaphragm, and a connection between said piston and the first mentioned diaphragm.

4. A regulator for controlling flow of air through a conduit and comprising a case, a diaphragm dividing said case into chambers, a tube connecting one of the chambers with said conduit whereby pressure is transmitted from the latter to the former, a damper actuating diaphragm, a housing, a tube connecting the interior of the housing with the chamber on one side of said damper actuating diaphragm, and a valve operatively connected with the first mentioned diaphragm to control ports communicating with said tube to thereby control the movement of the valve operating diaphragm.

5. A regulator for controlling flow of air through a conduit and comprising a case, a diaphragm dividing said case into chambers, a tube connecting one of said chambers with said conduit whereby pressure is transmitted from the latter to the former, a valve operating diaphragm adapted to be connected with a damper in said conduit, and a connection between said diaphragms and including a valve operated by the diaphragm first mentioned to control pressures on opposite sides of the actuating diaphragm.

6. A volume regulator constructed for operation in connection with a conduit for the transmission of fluid and comprising a case, a diaphragm dividing said case into chambers, tubes connecting each of said chambers with the passage in said conduit, one of said tubes being arranged to receive air from the current in the conduit by reason of the velocity of said current whereby the dynamic pressure is established in one of said chambers, and a damper actuating member operatively connected with said diaphragm.

7. A volume regulator constructed for operation in connection with a conduit for the transmission of fluid and comprising a case, a diaphragm dividing said case into chambers, tubes connecting each of said chambers with the passage in said conduit, one of said tubes being arranged to receive air from the current in said conduit by reason of the velocity of said current whereby dynamic pressure is established in one of said chambers, means to resiliently resist said dynamic pressure, and a damper actuating member operatively connected with said diaphragm.

8. A volume regulator constructed for operation in connection with a conduit for the transmission of fluid and comprising a case, a valve operating diaphragm located in the case, a damper operating diaphragm located in the case, a valve connected with the valve actuating diaphragm to control pressures on opposite sides of the valve actuating diaphragm, and means controlled by said valve for transmitting pressures from one side of the damper actuating diaphragm to the other side thereof.

9. A volume regulator constructed for operation in connection with a conduit for the transmission of fluid and comprising a case, a valve actuating diaphragm located in said case, a valve connected with said diaphragm, a valve cylinder to receive said valve, a damper actuating diaphragm operatively connected with said cylinder, and means controlled by said valve for transmitting pressure from one side of the damper actuating diaphragm to the other side thereof.

10. A volume regulator comprising a case arranged for connection with a conduit for a conveyance of air, a diaphragm dividing said case into chambers, tubes connecting each of said chambers with the passage in said conduit, one of said tubes being arranged to receive air from the current in the conduit by reason of the velocity of said current whereby dynamic pressure is established in one of said chambers, a damper located in said conduit, and mechanism connecting said diaphragm and damper whereby the position of the latter is controlled by the dynamic pressure in said chamber.

11. A regulator for controlling flow of fluid through a conduit and comprising a damper located in said conduit, a mechanism for actuating said damper, and an air current interrupter located adjacent to the seat of the damper and spaced therefrom when the latter is nearly closed to provide a tortuous passage whereby to obstruct flow of fluid passing the edges of said damper when it is in its nearly closed position thereby breaking up the sound waves to reduce transmission of sound with the volume of air, said interrupter permitting a substantially free flow when the damper is in its open position.

IRA H. SPENCER.